Oct. 25, 1932.  J. SCHNEIDER, JR  1,884,283
AUTOMOBILE NONSKID DEVICE
Filed April 29, 1932
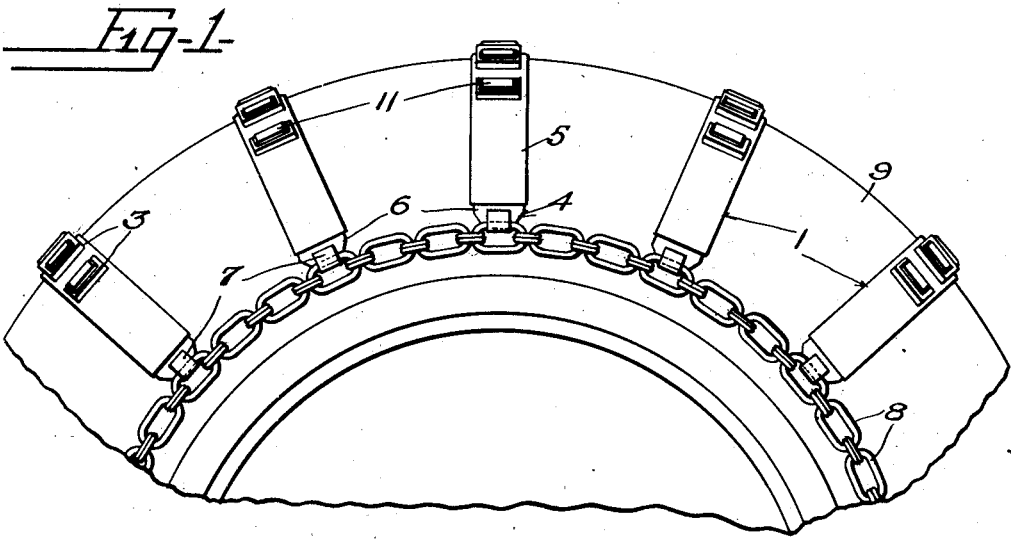
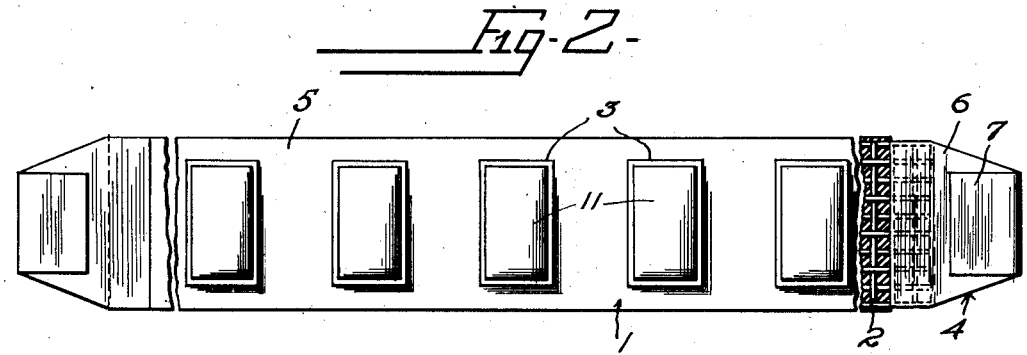
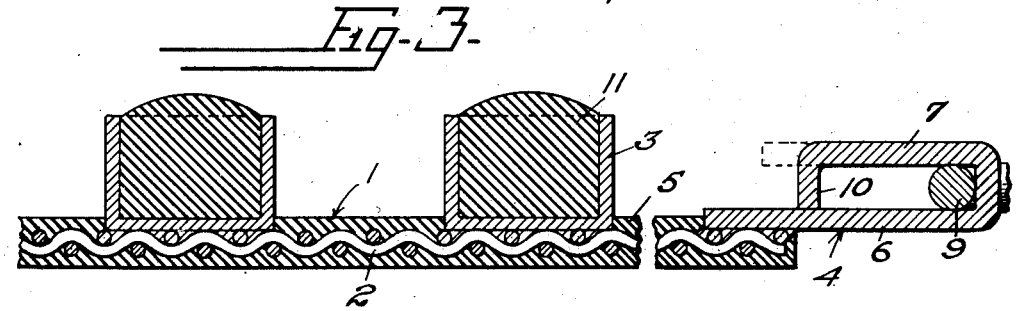
*John Schneider Jr.*
INVENTOR
BY *Victor J. Evans & Co.*
ATTORNEY
WITNESS:

Patented Oct. 25, 1932

1,884,283

UNITED STATES PATENT OFFICE

JOHN SCHNEIDER, JR., OF SLOATSBURG, NEW YORK, ASSIGNOR OF ONE-HALF TO JOHN SCHNEIDER, SR., OF SLOATSBURG, NEW YORK

AUTOMOBILE NONSKID DEVICE

Application filed April 29, 1932. Serial No. 608,292.

This invention relates to non-skid cross elements for anti-skid chains and has for the primary object, the provision of a device of the above stated character which will provide maximum traction with minimum noise and is so constructed as to have increased wearing qualities over devices now in use for the same purpose.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating an anti-skid chain with cross elements constructed in accordance with my invention and showing the same applied to a tire.

Figure 2 is a plan view partly in section illustrating the cross elements.

Figure 3 is a fragmentary sectional view illustrating the same.

Referring in detail to the drawing, the numeral 1 indicates a cross strap or element for anti-skid chains, the base of which is constructed from a woven metallic material 2 to which is welded at spaced intervals cup shaped calks or anti-skid elements 3 and also has welded to its ends fastening elements 4. A covering 5 of rubber or any other suitable material is provided for the base 2 so as to completely enclose the latter. The covering 5 may be vulcanized or otherwise secured to the base.

The fasteners 4 are in the form of plates 6 which are bent upon themselves to form hook portions 7 adapted to extend through opposite links of side chains 8 of an anti-skid device so that when applied to a tire 9 the straps or elements 1 are arranged transversely of the tire at spaced intervals and readily conform to the contour of the tire due to the construction thereof. After the hook shaped portions 7 of the fasteners 4 are passed through the links they are bent into engagement with the plates 6 as shown at 10.

Cushion blocks 11 are suitably secured within the cup shaped calks 3 and project outwardly therefrom for the purpose of engaging the roadway. The device when operating on a hard surface will be practically noiseless due to the cushion blocks 11 engaging the hard surface and retaining the calks 3 out of engagement therewith. When the device is operating within mud, snow or the like, the calks 3 will embed or bite therein and thus obtain maximum traction. The cushion blocks 11 when engaging a hard surface will prevent or retard skidding.

A device constructed in accordance with the foregoing is capable of producing maximum results either when operating on soft or hard surfaces and also is capable of providing wearing qualities which will greatly exceed the devices now in use for the same purpose due to the fact that metallic parts are prevented from engaging hard surfaces which have proven from actual use to quickly destroy or wear out devices constructed entirely of metal. The device also will reduce noise to a minimum.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. A non-skid element for anti-skid chains comprising a woven metallic strap, means for connecting said strap to side elements of an anti-skid device, hollow metallic calks secured to said strap, a yieldable covering for said strap, and cushion means carried by said calks and projecting outwardly therefrom.

2. A non-skid element for anti-skid chains comprising a woven metallic strap, means for connecting said strap to side elements of an anti-skid device, cupshaped metallic calks welded to said strap, an elastic covering for said strap and vulcanized thereto, and cushion blocks carried by said calks and projecting outwardly therefrom.

3. A non-skid element for anti-skid chains comprising a woven metallic strap, plates welded to the ends of the strap and bent to form hooks to engage side elements of the anti-skid device, metallic cup shaped calks welded to the strap, an elastic covering for the strap and vulcanized thereto, and cushion blocks secured in said calks and projecting outwardly therefrom.

In testimony whereof I affix my signature.

JOHN SCHNEIDER, Jr.